US005210551A

United States Patent [19]

Inoue et al.

[11] Patent Number: 5,210,551

[45] Date of Patent: May 11, 1993

[54] ELECTROSTATIC RECORDING APPARATUS WITH AN ELECTRODE DRIVE MEANS WITHIN THE DEVELOPER CIRCULATING PATH

[75] Inventors: Hideaki Inoue, Tokyo; Eiichi Takeuchi; Shigeru Shimizu, both of Iruma; Tadao Yamamoto, Tokyo; Yasuhito Sato, Tokyo; Kenji Nakayama, Tokyo; Hideki Takahashi, Tokyo; Toshiro Honda, Tokyo; Kenichiro Asako, Tokyo, all of Japan

[73] Assignee: Casio Computer Co., Ltd., Tokyo, Japan

[21] Appl. No.: 710,684

[22] Filed: Jun. 5, 1991

[30] Foreign Application Priority Data

Jun. 18, 1990 [JP] Japan .................................. 2-159349
Oct. 11, 1990 [JP] Japan .................................. 2-272994

[51] Int. Cl.[5] .................................. G01D 15/06

[52] U.S. Cl. .................................. 346/155; 346/153.1; 355/251; 355/261; 355/265

[58] Field of Search .................. 346/153.1, 155, 160.1; 355/251, 263, 261, 265; 118/647, 657

[56] References Cited

U.S. PATENT DOCUMENTS

| | | | |
|---|---|---|---|
| 3,739,087 | 6/1973 | Metcalfe et al. | 178/6.6 |
| 3,879,737 | 4/1975 | Lunde | 346/74 |
| 3,914,771 | 10/1975 | Lunde et al. | 346/74 |
| 4,338,615 | 7/1982 | Nelson et al. | 346/153.1 X |
| 4,558,941 | 12/1985 | Nosaki et al. | 355/261 |
| 4,559,545 | 12/1985 | Iemura et al. | 346/155 |
| 4,568,955 | 2/1986 | Hosoya et al. | 346/153.1 |
| 4,573,061 | 2/1986 | Fujii | 346/153.1 |
| 4,637,708 | 1/1987 | Yuasa | 355/3 |
| 4,647,179 | 3/1987 | Schmidlin | 355/261 |
| 4,666,780 | 5/1987 | Krum | 428/418 |
| 4,739,348 | 4/1988 | Ando et al. | 346/155 |
| 4,743,926 | 5/1988 | Schmidlin et al. | 346/160.1 X |
| 4,780,733 | 10/1988 | Schmidlin | 346/160.1 |
| 4,994,859 | 2/1991 | Mizuno et al. | 355/247 |

FOREIGN PATENT DOCUMENTS

| | | |
|---|---|---|
| 0298195 | 1/1989 | European Pat. Off. . |
| 0342798 | 11/1989 | European Pat. Off. . |
| 54-97035 | 7/1979 | Japan . |
| 57-179872 (A) | 11/1982 | Japan . |
| 62-287267 | 12/1987 | Japan . |

*Primary Examiner*—Benjamin R. Fuller
*Assistant Examiner*—Randy W. Gibson
*Attorney, Agent, or Firm*—Nixon & Vanderhye

[57] ABSTRACT

An electrostatic recording apparatus includes a developing agent carrying member having a surface for carrying a developing agent thereon. A plurality of recording electrodes are arranged on the surface of the developing agent carrying member in parallel to each other at a predetermined gap while being electrically insulated from each other. An electrode cylinder is arranged to oppose the plurality of recording electrodes at a predetermined gap. A developing agent convey section conveys the developing agent such that a circulating convey path is formed along the surface of the developing agent carrying member. A voltage control section outputs a control signal including recording data. A recording electrode drive section is provided inside a space defined by the circulating convey path. Upon reception of the control signal from the voltage control section, the recording electrode drive section applies a recording voltage to the plurality of recording electrodes in accordance with the recording data, and selectively transfers the developing agent conveyed by the developing agent convey section to the electrode cylinder, thereby forming a recording image.

14 Claims, 14 Drawing Sheets

ELECTROSTATIC RECORDING APPARATUS WITH AN ELECTRODE DRIVE MEANS WITHIN THE DEVELOPER CIRCULATING PATH

BACKGROUND OF THE INVENTION

1. Field of the Invention

The present invention relates to a non-contact electrostatic recording apparatus which forms an electrostatic recording image without bringing its recording head into contact with a recording medium.

2. Description of the Related Art

Conventionally, a multi-stylus printer is known well as one type of an electrostatic recording apparatus. In a multi-stylus printer, a large number of needle-like recording electrodes are arranged in the main scanning direction at a very small equal pitch to constitute a recording head. A voltage is selectively applied to the needle-like electrodes in accordance with a recording signal. Electrical discharge is performed directly onto a recording sheet to form an electrostatic latent image. In this case, a special paper sheet coated with an agent having a high electric resistance is used so that charges can be easily and stably held on the sheet. However, such a special sheet is not suitable to be written with a pencil or a pen. In addition, it can be deteriorated by environmental conditions such as humidity and thus cannot be kept stored for a long period of time. Therefore, this type of paper is not suitable for office use.

When a gap between the distal ends of the needle-like electrodes and the sheet surface is large, the electric field is spread to increase the size of the dot to be formed, making it difficult to obtain a recording image having a high resolution. For this reason, a gap material is provided for the sheet surface. The gap material and the distal ends of the needle-like electrodes are brought into slidable contact with each other so that a very small gap can be maintained. In this case, however, the distal ends of the needle-like electrodes are worn.

In order to use ordinary paper and to correctly keep the very small gap between the image medium and the distal ends of the recording electrodes, a method is adopted to preliminarily form a toner image on a drum-like intermediate recording medium and to transfer the toner image on a sheet. With this method, since the intermediate recording medium is used, the entire system tends to become large in size. In order to avoid this size increase, a process for performing both recording and developing simultaneously is often employed. In this case, the recording electrodes are arranged along the widthwise direction (main scanning direction) of the developing agent convey path. The developing agent is supplied in the sub-scanning direction perpendicular to the main scanning direction and is selectively transferred onto the intermediate recording medium from the recording electrodes, thereby forming a toner image.

However, the recording electrodes are present in the developing agent supply direction. In order to prevent the recording electrodes from interfering with the developing agent supply, a large number of holes for allowing the developing agent to pass therethrough must be formed at portions of a film substrate or the like constituting the recording electrodes excluding the portions of the recording electrodes, and the developing agent must be supplied through these holes. When these holes are formed, however, they pose restriction on the space to arrange the recording electrodes on the film substrate. As a result, high-density recording electrodes cannot be arranged, and a recording apparatus with a high printing resolution cannot be obtained.

SUMMARY OF THE INVENTION

It is, therefore, an object of the present invention to provide a compact electrostatic recording apparatus in which a drive circuit for recording electrodes is arranged within a developing agent supply path, thereby enabling a high-density arrangement of the recording electrodes.

In order to achieve the above object, the electrostatic recording apparatus according to the present invention comprises:

a developing agent carrying member having a surface for carrying a developing agent thereon;

a plurality of recording electrodes arranged on the surface of the developing agent carrying member in parallel to each other at predetermined gaps, while being electrically insulated from each other;

an electrode cylinder opposing the plurality of recording electrodes at a predetermined gap;

developing agent convey means for conveying the developing agent so as to form a circulating convey path along the surface of the developing agent carrying member;

voltage control means for outputting a control signal including recording data; and recording electrode drive means, provided inside a space defined by the circulating convey path, for applying, upon reception of the control signal from the voltage control means, a recording voltage to the plurality of recording electrodes in accordance with the recording data, thereby selectively transferring the developing agent conveyed by the developing agent convey means to the electrode cylinder, thus forming a recording image.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described in detail with reference to the accompanying drawings.

Figure 1:
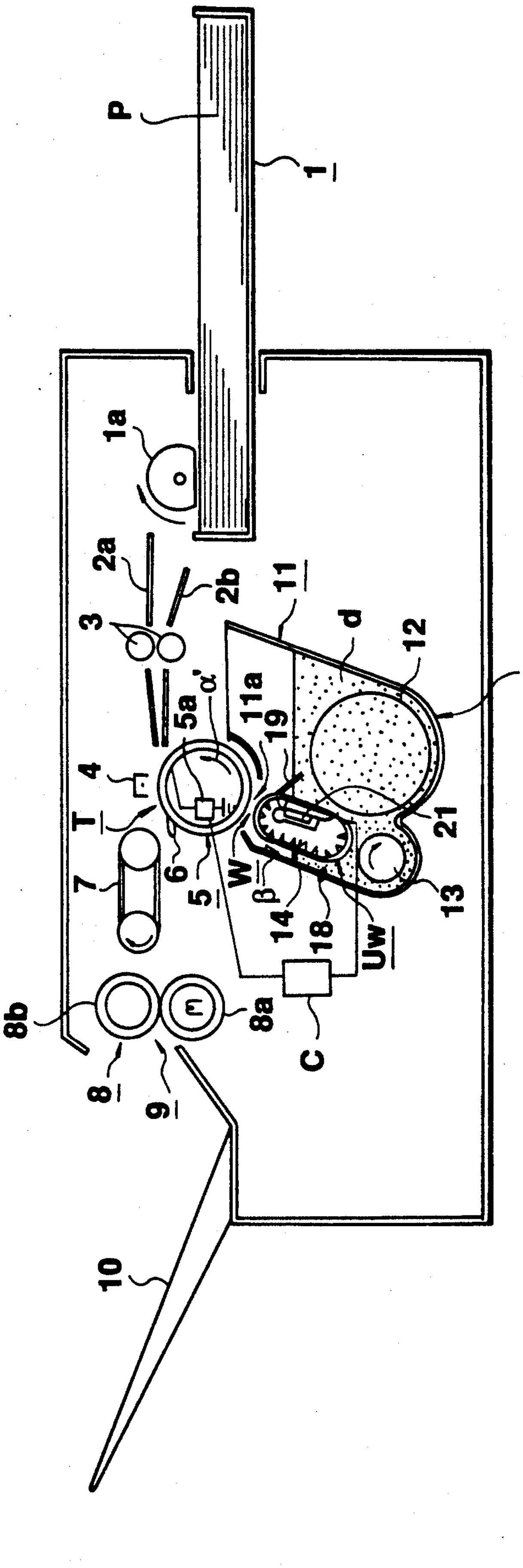
FIG. 1 is a schematic sectional view of an overall arrangement of an electrostatic recording apparatus according to the first embodiment of the present invention.

FIG. 1 is a schematic sectional view of the overall arrangement of a recording apparatus according to the first embodiment of the present invention. Referring to FIG. 1, a paper cassette 1 stacking normal paper cut sheets P therein is detachably mounted on a side of the machine frame. A paper feed roller la is arranged above the distal end of the inserted paper cassette 1 such that it can be driven to rotate in the direction indicated by an arrow. A sheet convey path defined by upper and lower convey guide plates 2*a* and 2*b* made of an insulating material is formed in front of the paper feed roller la. A wait roller pair 3 is arranged midway along the sheet convey path. When a sheet P is fed by the paper feed roller la, it is stopped by the wait roller pair 3 and set in a correct convey position. Then, the wait roller pair 3 feds the sheet P to an image transfer section T on its downstream side at a timing synchronized with a timing at which a recording image to be described later reaches the image transfer section T.

In the image transfer section T on the downstream side of the wait roller pair 3, a transfer charger 4 is arranged to oppose an electrode cylinder 5 serving as an image carrier. In this embodiment, the electrode cylinder 5 is driven to rotate counterclockwise as indicated by an arrow $\alpha'$. A developing agent having a negative frictional charging polarity is used for the electrode cylinder 5, as will be described later. Therefore, a bias power source 5*a* capable of generating a recording bias voltage of $-50$ V and a cleaning voltage of $+200$ V is connected to the electrode cylinder 5. The bias power source 5*a* is connected to a signal recording section C for controlling the recording operation of the overall recording apparatus. The output voltages from the bias power source 5*a* can be switched in accordance with a voltage control signal supplied from the recording control section C.

A recording image forming unit U to be described later is arranged to oppose the surface of the electrode cylinder 5 opposite to the image transfer section T. A toner recording image is formed on the surface of the electrode cylinder 5 by the recording image forming unit U. As the electrode cylinder 5 is rotated, the toner recording image is conveyed to the image transfer section T and transferred onto a sheet being supplied. The arrangement of the recording image forming unit U will be described later in detail.

A separation gripper 6 is arranged on the downstream side of the image transfer section T such that its distal end is urged against the surface of the electrode cylinder 5. An air suction type convey belt 7 horizontally extends on the downstream side of the separation gripper 6. When the recording image is transferred onto a sheet P and the sheet P is separated from the surface of the electrode cylinder 5 by the separation gripper 6, the convey belt 7 conveys the sheet P toward a fixing unit 8 provided in front of the belt 7 while attracting the rear surface of the sheet P by air suction. The fixing unit 8 consists of a heat roller 8*a* and a press roller 8*b*. The fixing unit 8 thermally fixes the toner image on the sheet P while clamping and conveying the sheet P therebetween. After fixing, the sheet P is discharged and stacked on a discharge tray 10 with its image surface facing downward.

As described above, according to the recording apparatus of this embodiment, the entire sheet convey path started by paper feed and terminated by paper discharge is formed substantially linearly. Therefore, the paper feed operation is generally smooth and an image error or a paper feed error such as jamming does not easily occur. More advantageously, face-down paper discharge, which eliminates the need for page arrangement and is thus preferable for a recording apparatus, can be obtained with the linear sheet convey path.

The arrangement of the recording image forming unit U will be described in detail.

The recording image forming unit U roughly has the following arrangement. An agitating roller 12 and a feed roller 13 are rotatably arranged at the bottom of a unit hopper 11 for storing the developing agent. An image recording means and a developing agent convey means are integrally arranged to constitute a recording unit Uw. The recording unit Uw is arranged such that its recording head assembly is positioned at an opening 11*a* of the hopper 11 open to the surface of the electrode cylinder 5. In this embodiment, an insulating magnetic toner having a negative charging characteristic, which is a one-component developing agent containing at least an insulating resin, a magnetic impalpable powder, and colorant particles, is used as the developing agent. A two-component developing agent in which a magnetic carrier and an insulating toner are mixed at a predetermined ratio can also be used as the developing agent.

Figure 2:
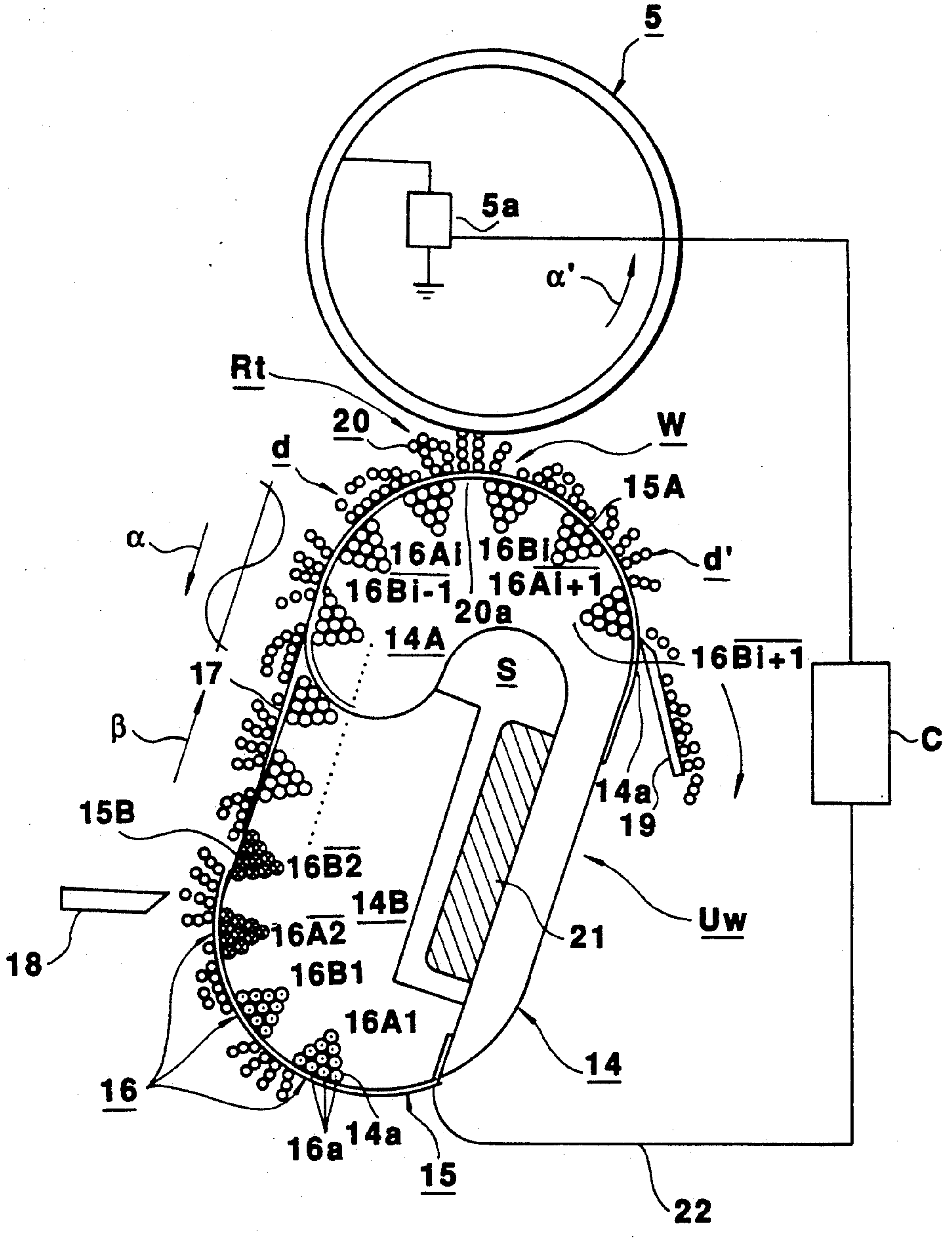
FIG. 2 is a sectional view showing an image forming unit with its peripheral arrangement of the electrostatic recording apparatus of FIG. 1.

FIG. 2 is a schematic sectional view of the recording unit Uw with its peripheral members. The recording unit Uw of this embodiment is a columnar member having an oval section and extending in a direction perpendicular to the sheet surface. An outer cover member 15 made of a non-magnetic material covers an area of the surface of a substrate 14 excluding a portion thereof. The substrate 14 is made of a highly permeable material such as iron, nickel, and Permalloy. The surface of the outer cover member 15 serves as the convey path of a magnetic toner d. A large number of recessed grooves 14*a* having V-shaped sections are formed in parallel to each other on the surface of the substrate 14 covered with the outer cover member 15. The recessed grooves 14*a* extend along the longitudinal direction of the substrate (direction perpendicular to the sheet surface) at equal intervals. In FIG. 2, only a total of 12 recessed grooves 14*a* are illustrated. In fact, however, a larger number of recessed grooves 14*a* than that are densely formed. The length of each recessed groove 14*a* is set to be larger than the width of the convey path defined on the surface of the outer cover member 15.

Figure 3A:
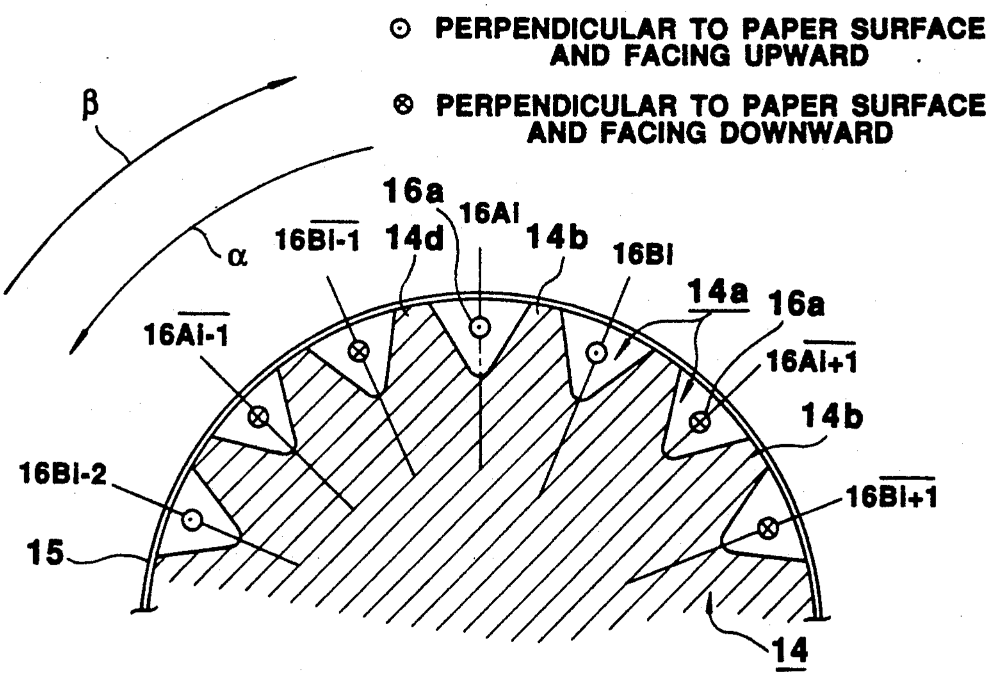
FIGS. 3A and 3B are views for explaining the configuration of an excitation coil.
Figure 3B:
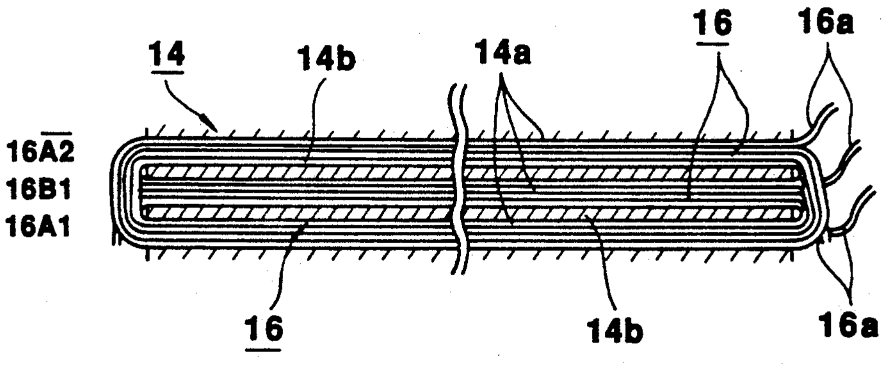

In each recessed groove 14*a*, a conductive wire 16*a* is buried to form a coil member 16 as a part of an excitation coil. In this embodiment, the coil members 16 are divided into two types, i.e., A and B, as shown in FIG. 3A. Coil members 16A and 16B are arranged alternately. In this case, as shown in FIG. 3B, a pair of coil members 16 adjacent to each other with a coil member 16 of another type sandwiched therebetween (e.g., a coil member 16A1 of an odd number and a coil member 16$\overline{\text{A2}}$ of an even number with a coil member 16B1 therebetween, the odd and even numbers being successive numbers) are formed by winding a single conductive wire 16*a* to extend in a pair of alternate recessed grooves 14*a* a plurality of times in a predetermined direction. As a result, the conductive wires 16*a* of a pair of alternately adjacent coil members 16 of the same type extend in opposite directions. When coil members 16 are to be divided into m types more than 3, the coil members of the same type are arranged at every (m−1)th places. A conductive wire 16*a* is wound to extend in a pair of alternate recessed grooves 14*a* at every (m−1)th places, thereby forming a pair of coil members of the same type.

Figure 4A:
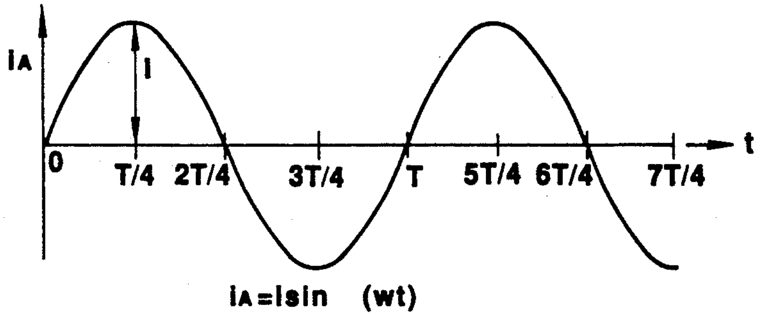
FIGS. 4A and 4B are waveform charts of a current flowing through the excitation coil shown in FIGS. 3A and 3B.
Figure 4B:
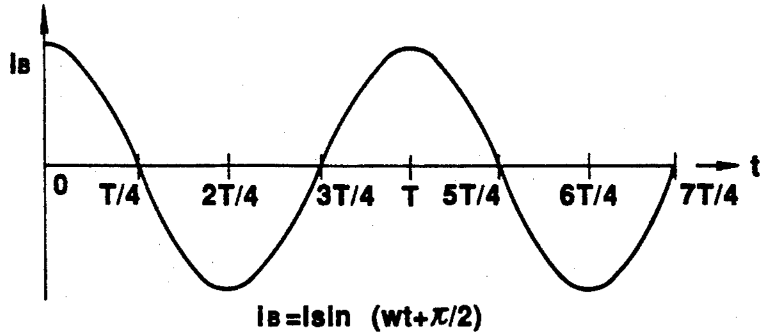
Figures 5A, 5B, 5C, 5D, 5E, 5F:
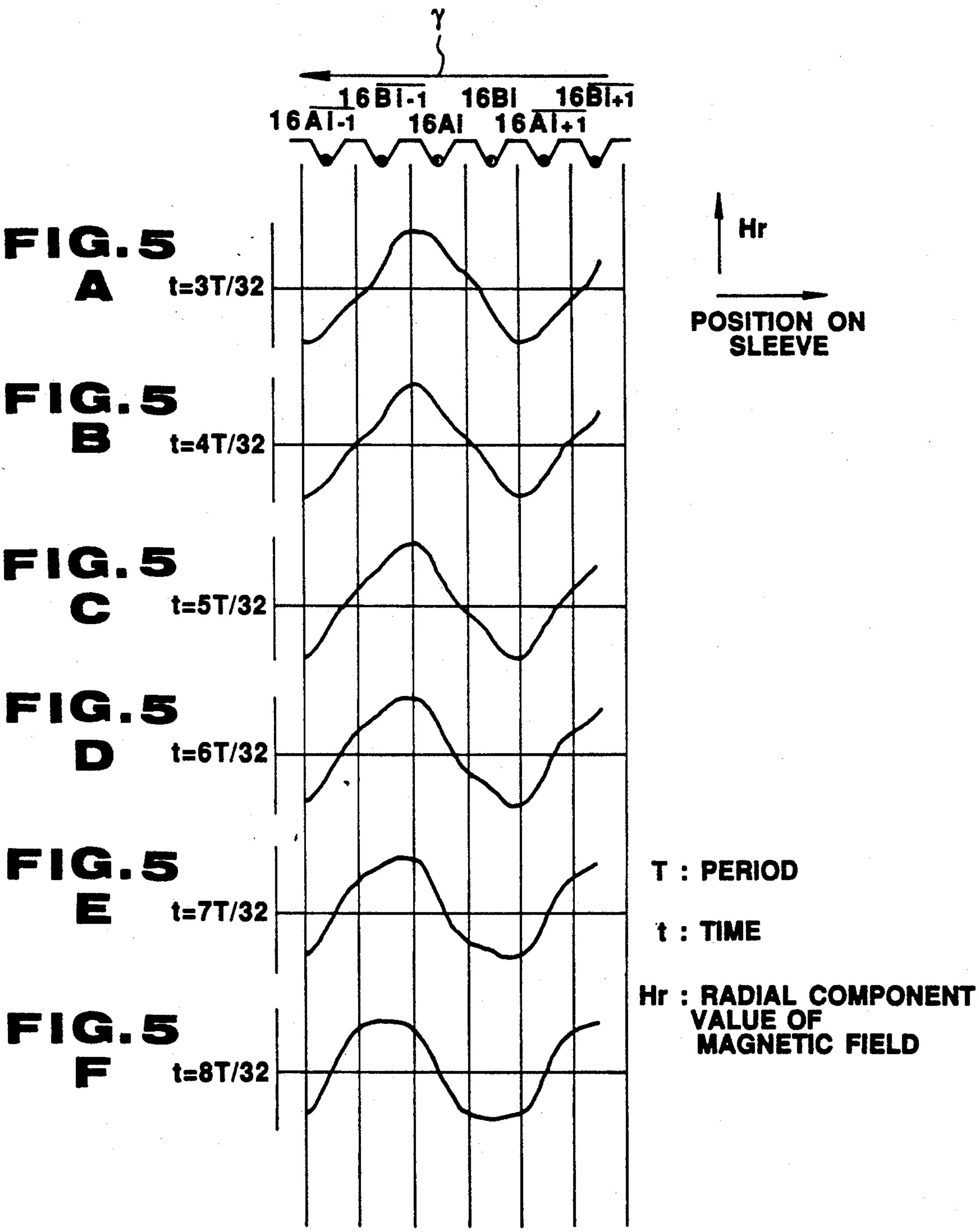
FIGS. 5A to 5F are waveform charts showing a change with time of a distribution curve of an excitation electric field generated by an energized excitation coil.

Two types (two phases) of alternating current $i_A$ and $i_B$:

$$i_A = I\cdot\sin(\omega t) \quad (1)$$

$$i_B = I\cdot\sin(\omega t + \pi/2) \quad (2)$$

whose phases are shifted from each other by $\pi/2$, as shown in FIGS. 4A and 4B, are supplied to the coil members 16A and the coil members 16B, respectively.

When the alternating current is supplied to each coil member 16, as described above, a magnetic field shown in FIGS. 5A to 5F corresponding to the supplied current is excited in each partitioning portion 14*b* between every adjacent recessed grooves 14*a* in the substrate 14. FIGS. 5A to 5F are graphs indicating a change with time of the excited magnetic field distribution on the surface of a sleeve 2. In FIGS. 5A to 5F, the axis of ordinate represents a component Hr of the excited magnetic field in the radial direction of the sleeve, and the axis of abscissa represents a position on the surface of the sleeve 2. Reference symbol T denotes the period of the supplied alternating current. In this embodiment, as described above, the extending direction of the conductive wire of the coil member 16 of an odd number and that of an even number, both of which are of the same type, are opposite. Hence, when in-phase alternating currents are supplied to the coil members 16 of the same type, the direction of the magnetic field excited by the coil members 16 of the even numbers and that of the odd numbers become opposite. As a result, the distribution curve of the magnetic field formed on the surface of the sleeve 2 has the waveform corresponding to the alternating current, as shown in FIGS. 5A to 5F. The waveform magnetic field changes over the period T in the same manner as the alternating current. As a result, a traveling wave magnetic field which travels in the direction of T in FIGS. 5A to 5F is formed. More specifically, referring to FIG. 3A, the waveform magnetic field formed on the surface of the sleeve 2 by all the coil members 16 travels along the surface of the outer cover member 15 at a predetermined speed in a counterclockwise direction $\alpha$. As a result, the magnetic toner is carried in a clockwise direction $\beta$ opposite to the traveling direction $\alpha$ of the traveling wave magnetic field. In this case, as shown in FIG. 2, the magnetic toner d is carried while forming a toner brush corresponding to the magnetic lines of force of the traveling wave magnetic field.

Referring back to FIG. 2, in this embodiment, the substrate 14 is split into halves, and an internal space S is formed when split substrates 14A and 14B are jointed. Outer cover members 15A and 15B cover the split substrates 14A and 14B, respectively. A bridge member 17 extends over the joint of the outer cover members 15A and 15B, thereby forming a flat toner convey path.

A doctor blade 18 is provided on the upstream of the toner convey path and regulates the toner brush to appropriate lengths, thus forming a toner layer. In this embodiment, the doctor blade 18 is fixed to the side wall of the unit hopper 11 such that its distal end is close to the surface of the outer cover member 15B. On the downstream of the doctor blade 18, a place where the surface of the outer cover member 15A becomes closest to the surface of the electrode cylinder 5 by a small gap therebetween, serves as a recording portion W. The magnetic toner d is selectively transferred at the recording portion W onto the surface of the electrode cylinder 5 to form a toner recording image. On the downstream of the recording portion W, a scraping plate 19 is provided such that its distal end is urged against the surface of the outer cover member 15A. A remaining magnetic toner d' which was not consumed at the recording portion W and conveyed is scraped down by the scraping plate 19.

Figure 6:
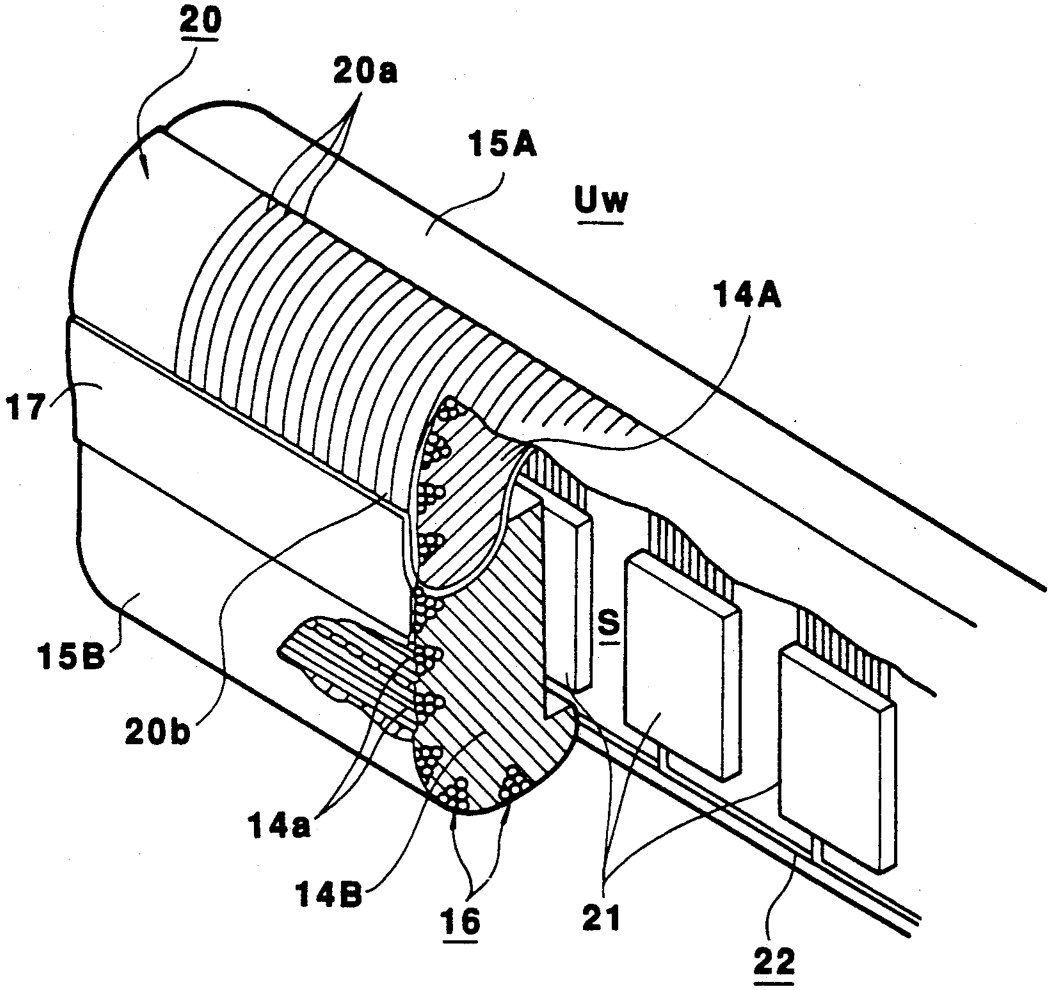
FIG. 6 is a partially cutaway perspective view of a recording unit of the image forming unit.

A recording electrode sheet 20 is applied on the surface of the outer cover member 15A at a region upstream the recording portion W with respect to the toner convey direction $\beta$. The recording electrode sheet 20 of this embodiment is constituted by a flexible printed circuit board (FPC), as shown in FIG. 6. A plurality of electrode wires 20*a* are formed on a base film 20*b* at a predetermined very small pitch in the sheet widthwise direction (toner convey path widthwise direction: main scanning direction). The electrode wires 20*a* extend parallel to each other in the longitudinal direction of the sheet 20. The number of recording electrode wires 20*a* is equal to the maximum number of data per main scanning line. In this embodiment, a large number of recording electrode wires 20*a* are patterned by etching at a 86 μm-pitch density (300 DPI) while maintaining a gap of 40 μm therebetween.

The recording electrode sheet 20 having the above arrangement extends downward under the bridge member 17, as shown in FIG. 6, and reaches the internal space S through one joint face of the split substrates 14A and 14B. A plurality of drive circuit elements 21 for driving the recording electrode wires 20*a* are arranged in the internal space S. The recording electrode wires 20*a* of the recording electrode sheet 20 are divided into groups each having an appropriate number of wires, and the wires 20*a* of each group are connected to the corresponding drive circuit element 21. An input wiring circuit 22 is derived from the drive circuit elements 21 to extend outside the recording unit Uw through the other joint face of the split substrates 14A and 14B. The input wiring circuit 22 is connected to the recording control section C. Thus, the drive circuit elements 21 apply recording control voltages to the corresponding recording electrode wires 20*a* in accordance with various types of recording control signals including recording data that are sent from the recording control section C.

The recording image forming operation of the recording apparatus of this embodiment will be described.

Referring to FIG. 2, when the alternating current as described above is supplied to the excitation coils, a traveling wave magnetic field that travels in the direction of the arrow c is formed on the surface of the recording unit Uw at a region where the excitation coils are arranged. The toner d is conveyed in the direction of the arrow $\beta$ opposite to the traveling direction of the magnetic field while forming a brush. The brush of the magnetic toner d being conveyed is regulated by the doctor blade 18 to a predetermined thickness, and the magnetic toner d is then conveyed to the recording portion W. At this time, the magnetic toner d is negatively charged by friction.

Figures 7A, 7B:
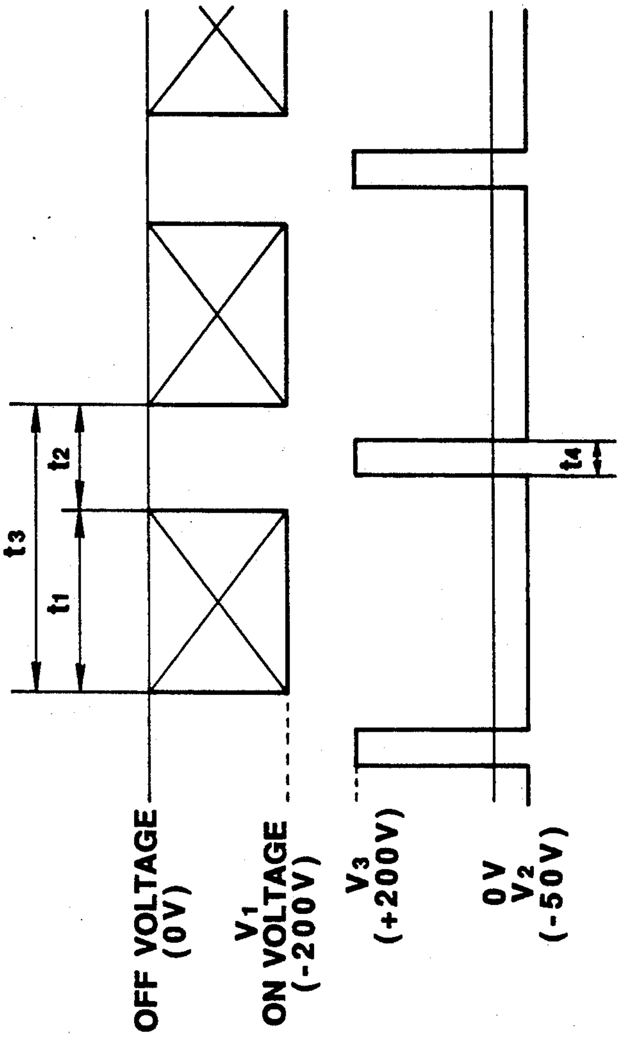
FIGS. 7A and 7B are timing charts, respectively, for explaining the control operations of the voltages applied to the recording electrodes and an electrode cylinder.

At the recording portion W, the voltages to be applied to the recording electrode wires 20*a* and the electrode cylinder 5 are controlled, as shown in FIGS. 7A and 7B, and the magnetic toner d on the recording electrode wires 20*a* is selectively transferred onto the surface of the electrode cylinder 5.

More specifically, as shown in FIG. 7A, in this embodiment, regarding the recording electrode wires 20*a*, the drive circuit elements 21 apply to them a recording voltage V1, that changes between −200 V (ON voltage) and 0 V (OFF voltage), during a predetermined recording time t1 in accordance with input recording data. In this case, the recording time t1 is a period of time required for forming a recording image on a single cut sheet P. A non-recording time t2 for applying a voltage of 0 V (OFF voltage) in this embodiment is saved between the recording time t1 and a subsequent recording period t1. The non-recording period t2 serves as a time interval for consecutively conveying cut sheets P. Thus, a period of time as the sum of the recording time t1 and the non-recording time t2 is an image forming period t3 for a single cut sheet P.

Meanwhile, regarding the electrode cylinder 5, as shown in FIG. 7B, the bias power source 5*a* intermittently applies to it a cleaning voltage V3 (+200 V in this embodiment) for cleaning the recording electrode wires 20*a* described above for a time t4 during each non-recording time t2. The cleaning time t4 is set shorter than the non-recording time t2. Except for the cleaning time t4, a bias voltage V2 of −50 V is applied in this embodiment.

During the recording time t1, when one-bit recording data input to each drive circuit element 21 is "H", the ON voltage of −200 V is applied to corresponding recording electrode wire 20*a*. Then, since the bias voltage of −50 V is applied to the electrode cylinder 5, a potential difference of +150 V is formed between the electrode cylinder 5 and the recording electrode wire 20*a* in the direction named. A negatively charged toner d shifts to a place of a high potential. Therefore, at the recording portion W where the gap is the narrowest and the electric field is maximum, only the magnetic toner d on the recording electrode wire 20*a* to which the voltage of −200 V is applied is selectively transferred onto the surface of the electrode cylinder 5 to form a black dot.

On the other hand, when the one-bit recording data is "L", an OFF voltage of 0 V, in this embodiment, is applied to the corresponding recording electrode wire 20*a*. As a result, the potential difference between the electrode cylinder 5 and the corresponding recording electrode wire 20*a* in this direction becomes −50 V. The negatively charged magnetic toner d is held on the recording electrode wire 20*a* and is not transferred.

In this manner, during the recording time t1, the potential of the recording electrode wires 20*a* is selectively controlled to either −200 V or 0 V in accordance with input recording data, and a toner recording image corresponding to the recording data is formed on part of the surface of the electrode cylinder 5 opposing to the recording electrode wires 20*a*. The density o the toner recording image can be adjusted by changing the bias voltage V2 of the bias power source 5*a*. In this case, an appropriate adjustment range is about 0 to about −50 V. The closer to 0 V, the higher the image density.

Then, during the cleaning time t4 within the nonrecording time t2, the cleaning voltage of +200 V is applied to the electrode cylinder 5, and the OFF voltage of 0 V is applied to all the recording electrode wires 20*a*. As a result, a potential difference of +200 V is formed between the electrode cylinder 5 and the recording electrode wires 20*a* in the direction named, and the magnetic toner d on all the recording electrode wires 20*a* is transferred onto the surface of the electrode cylinder 5. The potential difference in this case is larger than the potential difference of +150 V which is formed during application of the ON recording voltage during the recording time t1 described above Accordingly, even the magnetic toner which is not transferred during ON recording voltage application and remains on the recording electrode wires 20*a* can be forcibly transferred onto the surface of the electrode cylinder 5. This prevents the magnetic toner from being deposited on the recording electrode wires 20*a*. As a result, a decrease in image contrast or a defective image that occurs due to a voltage leakage among the recording electrode wires 20*a* through the deposited magnetic toner can be reliably prevented.

During the non-recording time t2 but except for the cleaning time t4, a bias voltage of −50 V is applied to the electrode cylinder 5, and an OFF voltage of 0 V is applied to the recording electrode wires 20*a*. Therefore, the magnetic toner d is held on the recording electrode wires 20*a* and is not transferred, as in the case when data is "L" during the recording time t1.

The magnetic toner d′, which remains at the recording portion W without being transferred to the electrode cylinder 5, shifts to the downstream as the traveling wave magnetic field travels, is scraped down by the scraping plate 19 from the surface of the outer cover member 15A, and is mixed by agitation with the stored magnetic toner.

The toner recording image formed on the surface of the electrode cylinder 5 is conveyed to the image transfer section T as the electrode cylinder 5 rotates counterclockwise in the direction $\alpha'$, as shown in FIG. 1. Then, the toner recording image is transferred onto a sheet which is supplied at an appropriate timing by the wait roller pair 3. The cleaning toner which has been forcibly transferred during the cleaning time t4 shifts over the image transfer section T during a time period corresponding to the feed interval of the cut sheets P. Therefore, the cleaning toner will not be transferred onto a cut sheet P to soil the image.

A pre-transferred toner (including the cleaning toner), which has not been transferred and remains on the surface of the electrode cylinder 5, is recovered to the recording portion W as the electrode cylinder 5 rotates. A toner mass Rt, which is the magnetic toner floating and remaining between the electrode cylinder 5 and the recording electrode wires 20*a*, is formed on the upstream of the recording portion W. When ON/OFF voltages are applied to the recording electrode wires 20*a*, bi-directional electric fields are also formed correspondingly on the upstream of the recording portion W, and the magnetic toner d reciprocates between the two electrode assemblies, thus forming the toner mass Rt. The surface of the electrode cylinder 5 is cleaned by the toner scraping effect of the toner mass Rt, and the cleaned surface reaches the recording portion W. At the recording portion W, clear toner recording images can be repeatedly formed by the cleaned surface of the electrode cylinder 5 and the recording electrode wires 20*a* which are cleaned during the cleaning t4.

During the cleaning time t4, a convey operation of the magnetic toner d by the coil members 16 can be interrupted. Then, the amount of toner which is forcibly transferred onto the surface of the electrode cylinder 5 during the cleaning time t4 is decreased, resulting in economization of the magnetic toner d.

Figures 8A, 8B:
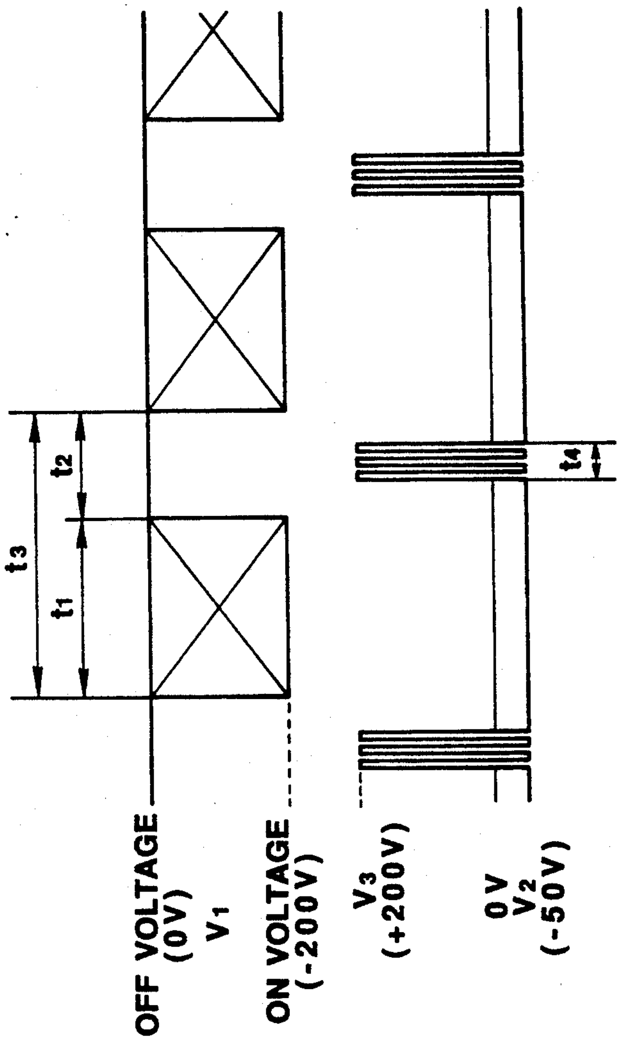
FIGS. 8A and 8B are timing charts, respectively, for explaining the modifications of the control operations of FIGS. 7A and 7B.

As shown in FIG. 8B, a voltage that changes in a pulse-like manner between the cleaning voltage V3 and the bias voltage V2 of this embodiment can be applied. In this case, the cleaning voltage V3 is applied during the non-recording time t2 shown in FIG. 8A. The image forming operation of this case is similar to that described with reference to FIGS. 7A and 7B, and a detailed description thereof is thus omitted. In this case, the frequency is set higher than a commercial frequency. In this embodiment, the developing agent attaching the recording electrodes is vibrated by the voltage frequency, further enhancing the cleaning effect for the recording electrodes.

The second embodiment of the present invention will be described. The same constituent elements as those in the first embodiments are denoted by the same reference numerals, and a detailed description thereof will be omitted.

Figure 9:
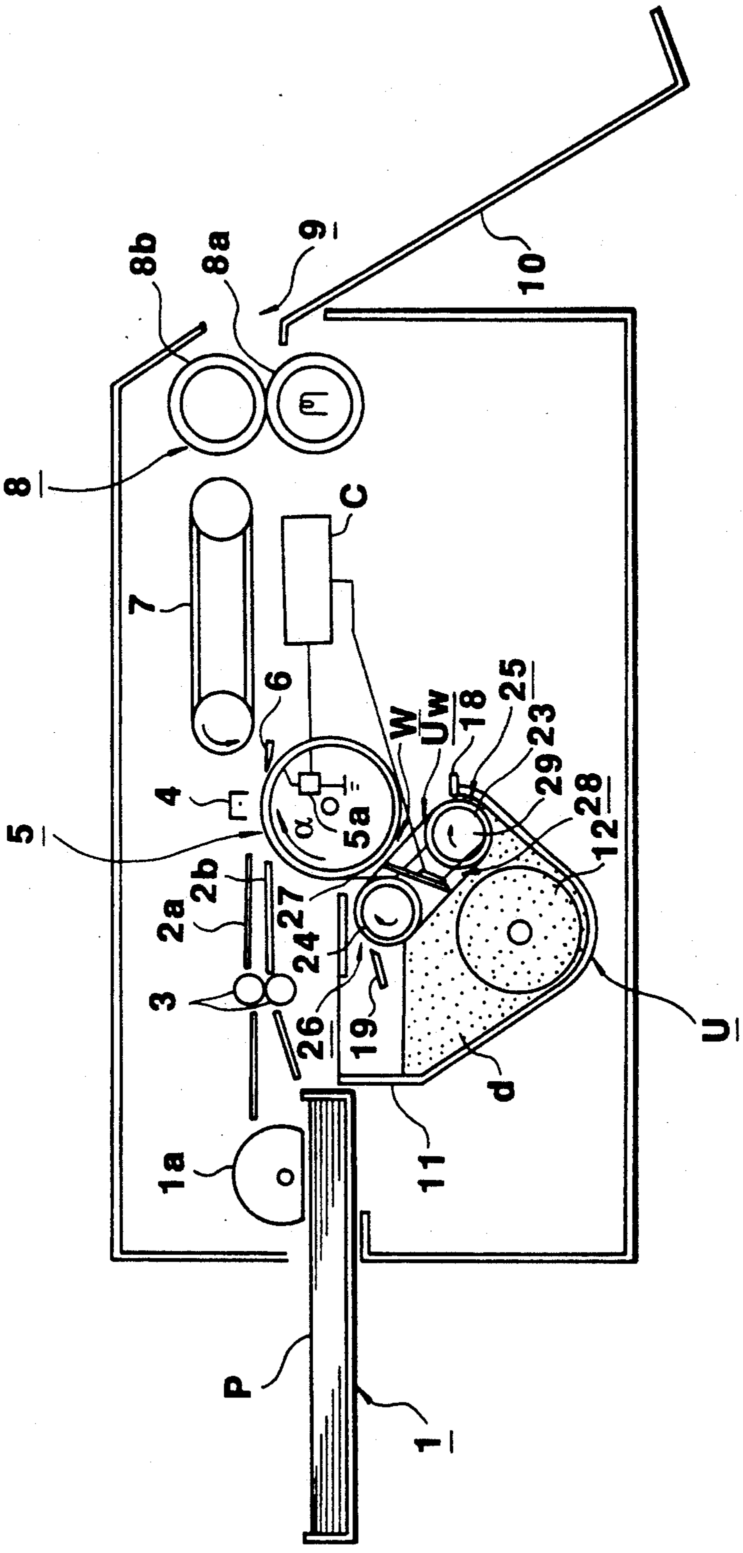
FIG. 9 is a schematic sectional view of the overall arrangement of an electrostatic recording apparatus according to the second embodiment of the present invention.
Figure 10:
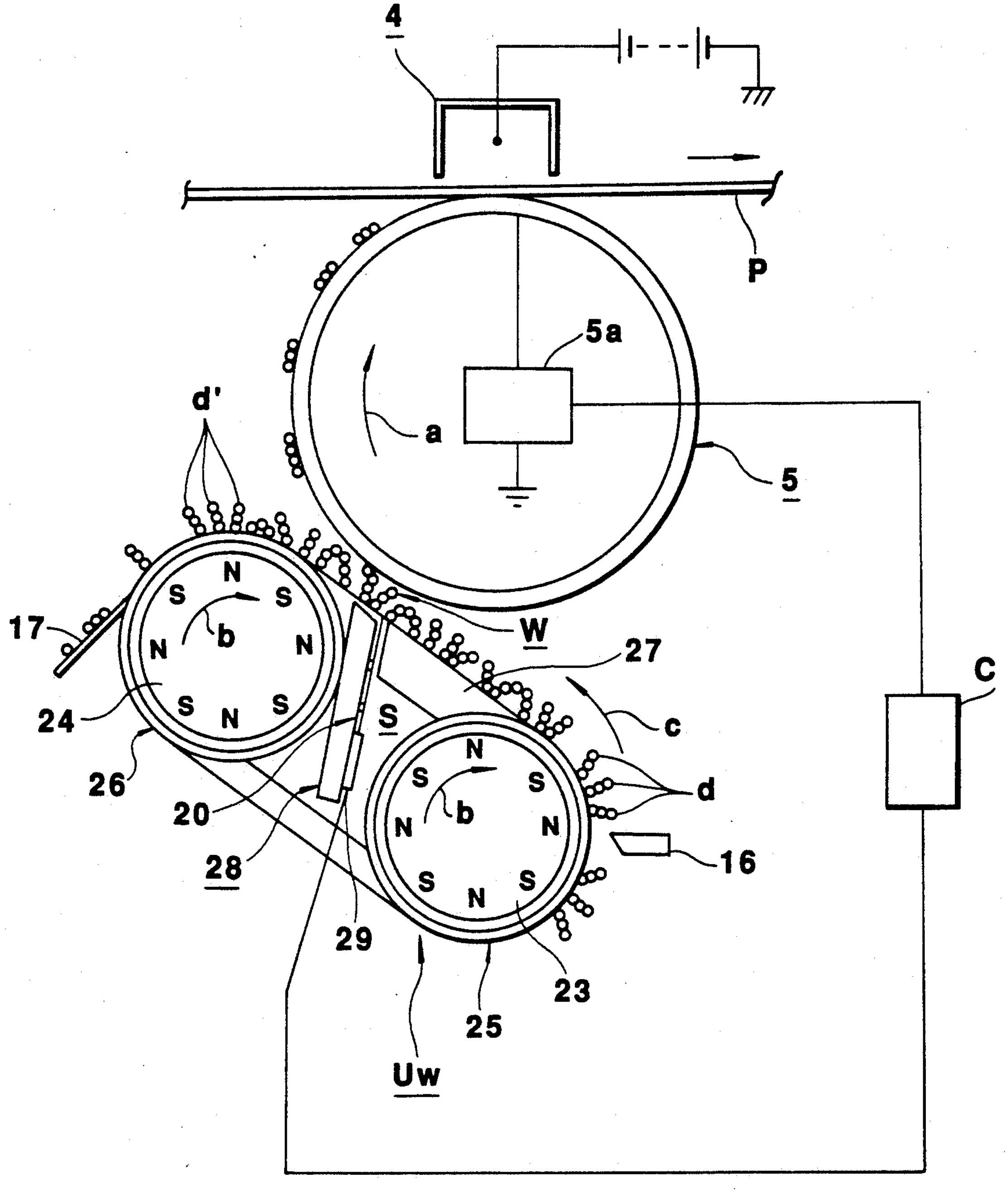
FIG. 10 is a schematic sectional view of an image forming process unit of the electrostatic recording apparatus shown in FIG. 9.
Figure 11:
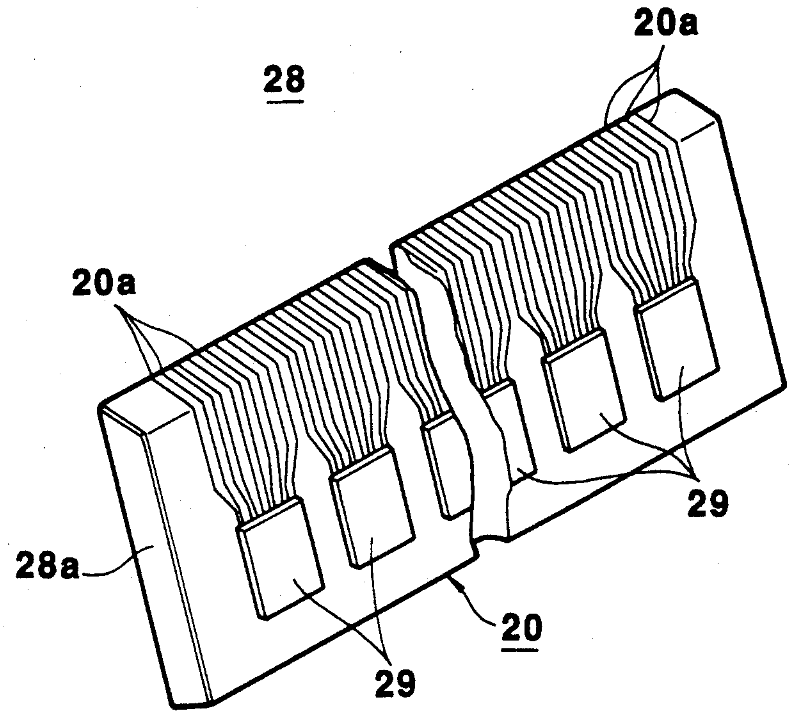
FIG. 11 is a perspective view of a recording electrode assembly.

In the embodiment shown in FIG. 9, a pair of magnetic rollers 23 and 24 are used as a developing agent convey means in the recording unit Uw of the image forming unit U. FIG. 10 is a schematic sectional view showing in detail an image forming process section comprising the recording unit Uw and the electrode cylinder 5. As shown in FIG. 10, the recording unit Uw of this embodiment has the following arrangement. A developing agent carrying member 27 made of a non-magnetic material is bridged between a pair of magnetic convey rollers 25 and 26 respectively housing magnet rollers 23 and 24. A recording electrode assembly 28 as the recording means is arranged between the magnetic convey rollers 25 and 26. When the magnet rollers 23 and 24 are rotated in the same direction indicated by an arrow b at the same speed, a synthetic rotating magnetic field formed by the composite force of the magnetic force of the magnet rollers 23 and 24 is formed on the surface of the developing agent carrying member 27. The magnetic toner d is conveyed by the synthetic rotating magnetic field along the surface of the developing agent carrying member 27 in the direction of an arrow c.

The distal end face of the recording electrode assembly 28 projects to a recording portion W, where the developing agent convey path along the surface of the developing agent carrying member 27 is closest to the surface of the electrode cylinder 5. The recording electrode assembly 28 is obtained by applying a recording electrode sheet 20, which is the same as that of the first embodiment, on the surface of a plate-like electrode support member 28*a*. Drive circuit elements 29 are directly mounted on the recording electrode sheet 20. As is apparent from FIG. 10, the drive circuit elements 29 are arranged inside the space defined by the circulating developing agent convey path.

In this embodiment, a bias power source 5*a* for applying a bias voltage to the electrode cylinder 5, and the drive circuit elements 29 for driving the recording electrode wires 20*a* are connected to a recording control section C, in the same manner as in the first embodiment. The drive control section C controls the voltage to be applied to the electrode cylinder 5 by the bias power source 5*a* and the voltage to be applied to the recording electrode wires 20*a* by the drive circuit elements 29 in the manner as shown in the timing charts of FIGS. 7A and 7B. Then, in the same manner as in the first embodiment, the magnetic toner attached to the recording electrode wires 20*a* is cleaned and is thus reliably prevented from depositing on the recording electrode wires 20*a*. As a result, a clean, good recording image without any image defect can be stably formed.

Since the recording electrode assembly 28 as the recording means is stored in the recording unit Uw, the recording unit Uw mounted with a high-density recording electrodes can be made compact. Therefore, the image forming process section comprising the electrode cylinder 5 with its peripheral arrangement and the recording unit Uw can be made further small in size. In fine, size reduction of a non-contact electrostatic recording apparatus using an intermediate recording medium (electrode cylinder 5) is greatly promoted.

The present invention is not limited to the specific embodiments described above. Various changes and modifications may be made within the spirit and scope of the invention.

For example, the recording electrodes are not limited to the wire electrodes, as in the above embodiments. The present invention can be similarly applied when recording electrodes are arranged in a spot-like manner, e.g., the needle-like electrodes of a so-called multi-stylus printer.

Furthermore, the present invention is also applied when a non-magnetic developing agent is used as the developing agent in place of a magnetic developing agent.

As has been described in detail, according to the first and second embodiments of the present invention, the drive circuits for the recording electrodes are arranged inside the space defined by the circulating developing agent convey means. Therefore, a recording means in which a large number of recording electrodes and their drive circuits are packaged in a high density, and a developing agent convey means can be integrally formed in a compact unit. Since recording and development are performed simultaneously, an electrostatic recording apparatus, which uses an intermediate recording medium and thus tends to be increased in size, can be made compact.

The recording electrodes arranged on the developing agent carrying member and the electrode cylinder also serving as the intermediate recording medium are opposed to each other through a very small gap. The cleaning voltage is applied to some of the recording electrodes opposing the electrode cylinder, so that the developing agent on the recording electrodes is forcibly transferred onto the electrode cylinder during the non-recording time when no recording image is formed. Therefore, the developing agent can be prevented from being deposited on the recording electrodes. As a result, a voltage leakage among the recording electrodes or an image defect, both of which can occur due to the deposited developing agent, can be reliably prevented. A high-contrast, high-resolution, clear recording image can be stably formed on a normal paper sheet.

Hence, a non-contact electrostatic recording apparatus which can stably form the high-quality recording image on a normal paper sheet, as described above, can be manufactured compact and low in cost.

Figure 12:
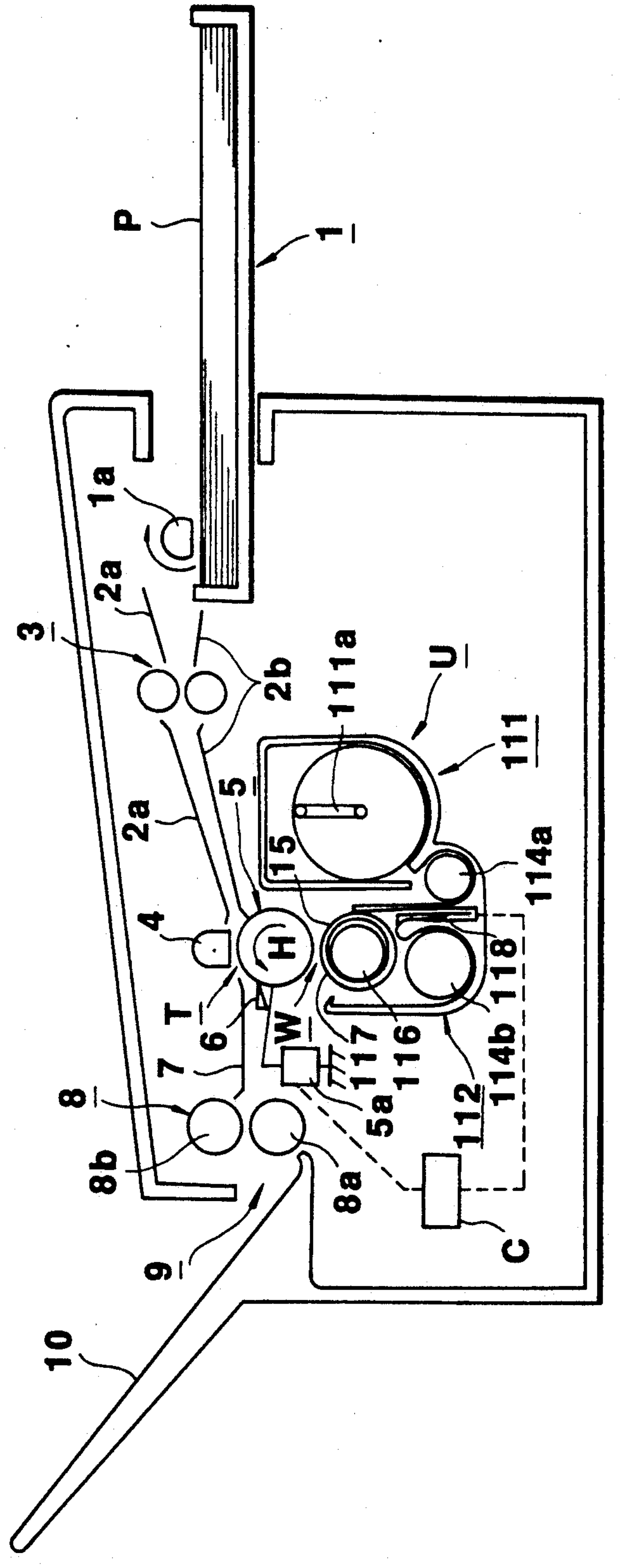
FIG. 12 is a schematic sectional view of the overall arrangement of an electrostatic recording apparatus according to the third embodiment of the present invention.

The third embodiment of the present invention will be described with reference to FIGS. 12 to 16. In FIG. 12, all the operation except for that of a recording image forming unit U is the same as in the first embodiment, and a detailed description thereof will be omitted.

Figure 13:
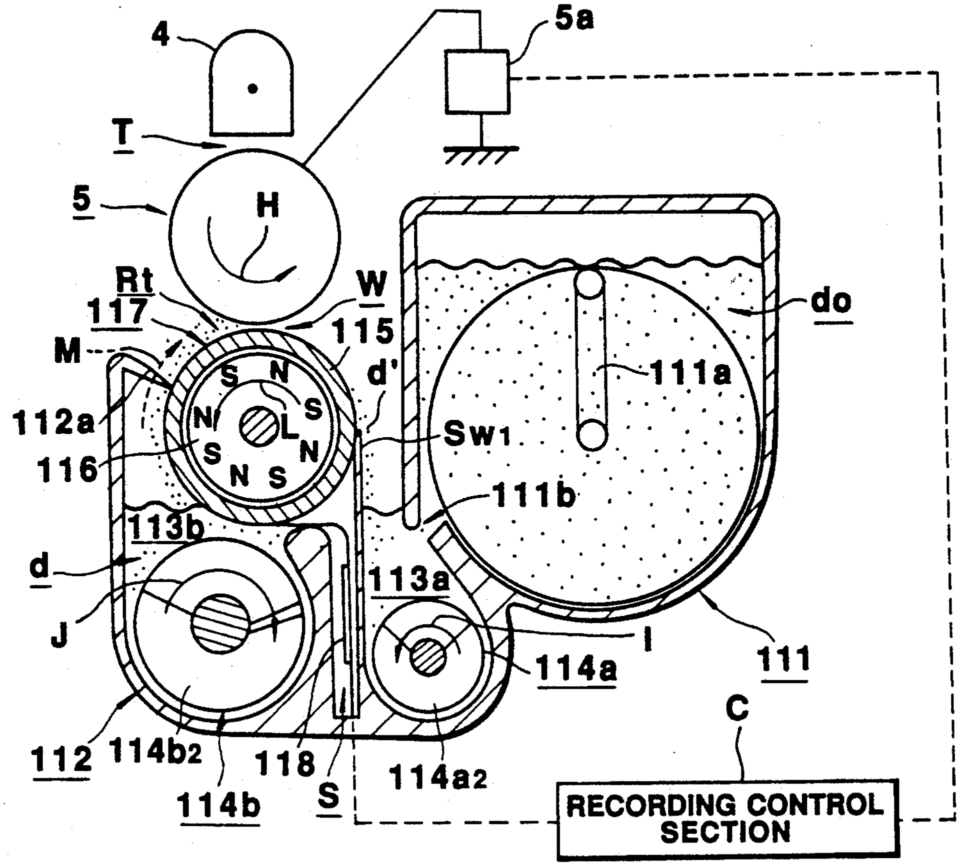
FIG. 13 is a sectional view of an image forming unit with its peripheral arrangement of the electrostatic recording apparatus shown in FIG. 12.

Briefly, the recording image forming unit U has a developing/recording tank 112 having a recording means and a developing agent convey means, and a developing agent tank 111 for reserving a supplementary developing agent, as shown in FIG. 13. An agitating blade is pivotally provided in the developing agent tank 111. In this embodiment, an insulating magnetic toner d which is a one-component developing agent containing at least an insulating resin, magnetic impalpable powder, and colorant particles and which has a negative friction charging polarity, is used as the developing agent. A two-component developing agent obtained by mixing a magnetic carrier and an insulating toner at a predetermined ratio can also be used as the developing agent. The friction charging polarity is not limited to negative, and a developing agent having a positive friction charging polarity can be used.

Figure 14:
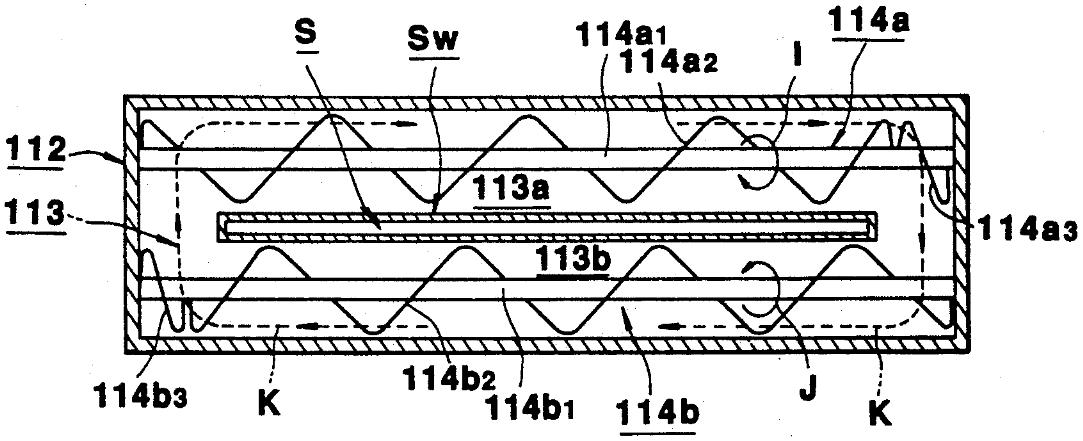
FIG. 14 is a sectional view showing a horizontal circulating path of the developing agent in the image forming unit.

A horizontal circulating path 113 for the developing agent is formed on the bottom of the developing-/recording tank 112, as shown in FIG. 14. Auger rollers 114*a* and 114*b* are rotatably provided in a pair of parallel longitudinal paths 113*a* and 113*b*, respectively, of the horizontal circulating path 113. The auger rollers 114*a* and 114*b* have the following arrangement. As shown in the perspective view of FIG. 14, a plurality of helical blades 114*a*2 and 114*b*2 are formed around shafts 114*a*1 and 114*b*. A reverse-feed blade 114*a*3 is formed on one end of the shaft 114*a*1, and a reverse-feed blade 114*b*3 is formed on one end of the shaft 114*b*1 opposite to the end of the shaft 114*a*1 on which the blade 114*a*3 is formed. The helical directions of the blades 114*a*3 and 114*b*3 are opposite. The auger rollers 114*a* and 114*b* are arranged in parallel to each other such that their reverse-feed blades 114*a*3 and 114*b*3 are located at opposite positions. The pair of auger rollers 114*a* and 114*b* are rotated in opposite directions of arrows I and J so that the developing agent is conveyed toward the reverse-feed blades 114*a*3 and 114*b*3, respectively, as shown in FIG. 14. Then, the reverse, opposite convey forces collide at the corner portions where the reverse-feed blades 114*a*3 and 114*b*3 are provided, and the magnetic toner is pushed out in the vertical direction and flows to the other longitudinal path. In this manner, in this embodiment, the magnetic toner is circulated while being agitated in the direction indicated by a broken arrow K. The magnetic toner can be sufficiently charged by friction during this circulation. When the material and shape of the auger rollers 114*a* and 114*b* are changed, a sufficient charging amount required for developing agent can be obtained.

A central space S is formed at the central portion of the horizontal circulating path 113 having the arrangement described above. The central space S is surrounded by a wall Sw so that the circulating developing agent will not penetrate therein. As shown in FIG. 13, a supply port 111*b* for a supplementary magnetic toner d0 is formed in the developing agent tank 111 along the axial direction of and above the auger roller 114*a* which is closer to the developing agent tank 111.

A developing sleeve 115 is provided above the other auger roller 114*b* to be in parallel with the auger roller 114*b* for conveying the developing agent in the vertical direction. The developing sleeve 115 rotatably stores a magnet roller 16 and is arranged to oppose the electrode cylinder 5 described previously. Difference magnetic poles are alternately formed on the surface of the magnet roller 116. The magnet roller 116 is driven counterclockwise in the direction indicated by an arrow L so that the magnetic toner d is conveyed along the surface of the developing sleeve 15 counterclockwise in the direction indicated by a broken arrow M.

A doctor blade 112*a* for regulating the conveyed developing agent to an appropriate thickness is provided on the surface of the developing sleeve 115, serving as the developing agent convey path, on the upstream in the developing agent convey direction. The surface of the developing sleeve 115 becomes closest to the surface of the electrode cylinder 5 at a position W through a very small gap on the downstream of the doctor blade 112*a*. This position W is the recording position. As will be described later, the magnetic toner d being conveyed to the position W is selectively transferred onto the surface of the electrode cylinder 5 in accordance with recording data, thereby forming a toner recording image. The very small gap at the recording position W is preferably set to be 100 μm or less in order to efficiently transfer the toner.

A wall Sw1 of the wall surrounding the central space S of the horizontal circulating path, described previously, extends on the downstream of the recording position W. The distal end of the wall Sw1 abuts against the surface of the developing sleeve 115. As a result, magnetic toner d', which has not been transferred at the recording position W, remained on the surface of the developing sleeve 115, and conveyed by the rotation of the magnet roller 116, is scraped down onto the longitudinal path 113*a* of the horizontal circulating path on the replenishment tank-side. Hence, the magnetic toner d' is prevented from penetrating into the central space S or being conveyed back directly to the upstream along the surface of the developing sleeve 115 without passing through the horizontal circulating path. A scraper may be provided independently from the surrounding wall of the central space S for scraping exclusively the remaining magnetic toner d' attaching the developing sleeve 115. In this case, this scraper may be supported in the vertical direction such that its distal end abuts against the surface of the developing sleeve 115 and its proximal end extends to the bottom of the central space S. If the scraper is made of a magnetic material, the magnetic force of the magnet roller 116 can be shielded, resulting in a smoother toner scraping/recovering effect.

Figure 15:
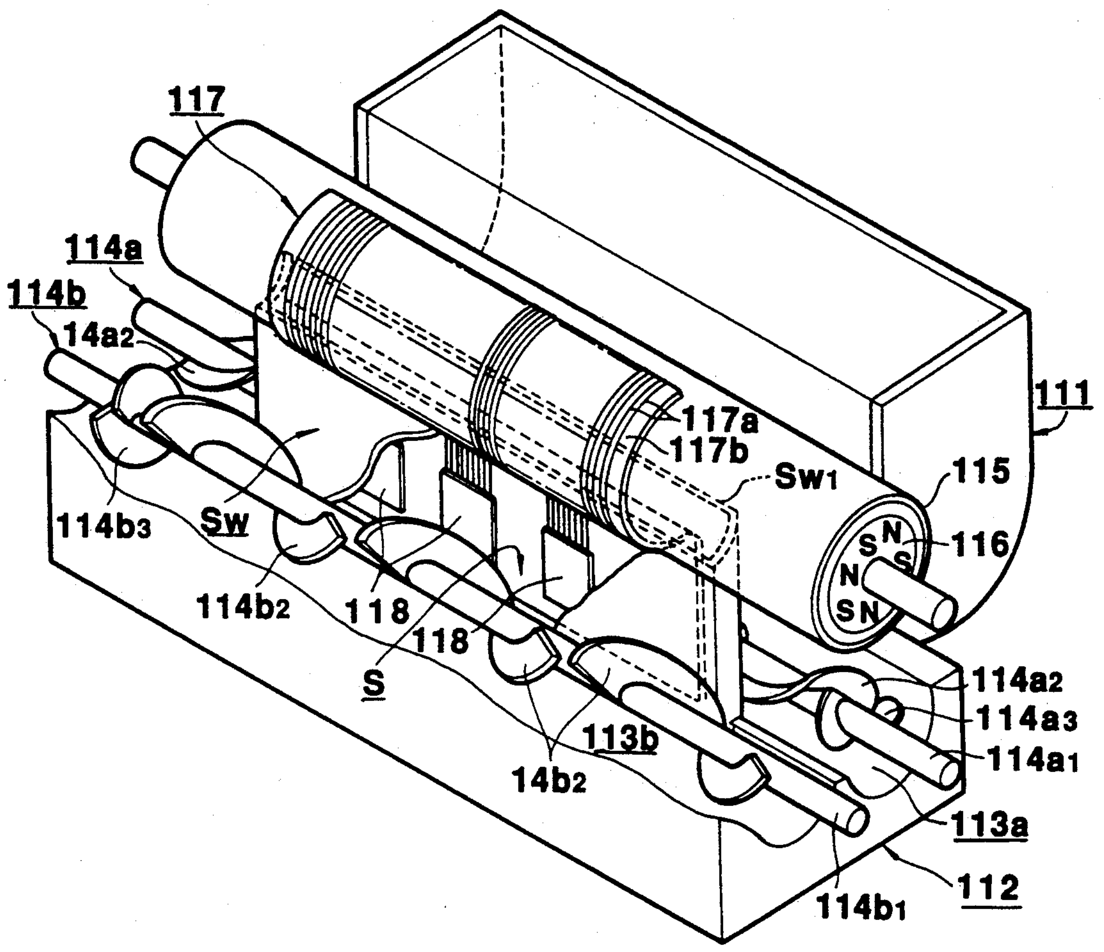
FIG. 15 is a perspective view of the image forming unit.

A recording electrode sheet 117 is placed on the surface of the developing sleeve 115 at a region upstream the recording position W in the toner convey direction. The recording electrode sheet 117 of this embodiment is constituted by a flexible printed circuit board (FPC). As shown in FIG. 15, a plurality of recording electrode wires 117*a* are formed on a base film 117*b* to be in parallel to each other at a predetermined very small pitch in the sheet widthwise direction (toner convey path direction: main scanning direction). The recording electrode wires 117*a* extend in parallel to each other in the longitudinal direction of the sheet 117. The number of recording electrode wires 117*a* is equal to the maximum number of data per main scanning line. In this embodiment, a large number of recording electrode wires 117*a* are patterned at a density of an 84.6-μm pitch (300 DPI) while maintaining a gap of 40 μm between the adjacent wires 117*a*.

Referring to FIG. 13, the recording electrode sheet 117 having the above arrangement is applied on approximately half the surface of the developing sleeve 115. Then, the recording electrode sheet 117 extends in the horizontal direction and thereafter in the vertical direction to reach inside the central space S of the horizontal circulating path described previously. The vertical extension of the recording electrode sheet 117 is mounted with a plurality of drive circuit elements 118 for applying a recording voltage to the recording electrode wires in accordance with input recording data. As shown in FIG. 15, the recording electrode wires 117*a* of the recording electrode sheet 117 are divided into groups each having an appropriate number of wires, and the wire groups are connected to the corresponding drive circuit elements 118. In this manner, when the portion of the recording electrode sheet 117 mounted with the drive circuit elements 11 is housed in the central space S, the drive circuit elements 118 can be protected from dust such as the developing agent, and the internal structure of the developing/recording tank 112 can be made compact.

The drive circuit elements 118 are connected to the recording control section C. Thus, the drive circuit elements 118 apply recording voltages to the recording electrode wires 117*a* in accordance with various recording control signals including recording data which are sent from the recording control section C.

The recording image forming operation of the electrostatic recording apparatus of this embodiment will be described.

Referring to FIG. 13, when the magnet roller 116 is rotated in the direction of an arrow L, a rotating magnetic field for pivoting the particles of the magnetic toner d is formed on the surface of the developing sleeve 115, and the magnetic toner d is conveyed in the direction of broken arrow M opposite to the rotating direction of the magnet roller 116 while forming a brush. The magnetic toner d being conveyed is regulated by the doctor blade 112*a* to have a predetermined thickness and reaches to the recording position W. At this time, the magnetic toner d used in this embodiment is sufficiently, negatively charged by the friction among the toner particles and the friction between the toner and the surface of the developing sleeve 115.

At the recording position W, the voltages to be applied to the recording electrode wires and to the electrode cylinder 5 are controlled as shown in FIGS. 7A and 7B to form a predetermined electric field, thus practicing the toner recording image forming operation. This operation is the same as that described in the first embodiment and thus a detailed description thereof will be omitted.

Referring to FIG. 12, a toner recording image and a cleaning toner is carried on the surface of the electrode cylinder 5, as described above, and are conveyed to the image transfer section T as the electrode cylinder 5 is rotated counterclockwise. The toner recording image is then transferred onto a paper sheet which is fed again at an appropriate timing by a wait roller pair 3 at the image transfer section T. On the other hand, the cleaning toner is not transferred and is conveyed to the downstream. In this case, the cleaning toner passes through the image transfer section T during the feed interval of a cut sheet P. Therefore, the cleaning toner will not attach the cut sheet P to soil the image.

Referring to FIG. 13, the pre-transferred toner and the cleaning toner that are carried on the surface of the electrode cylinder 5 are recovered to the recording position W along with the rotation of the electrode cylinder 5. A toner mass Rt is formed upstream the recording position W, in which the magnetic toner d floats and stays between the electrode cylinder 5 and the recording electrode wires. When the ON/OFF voltages are applied to the recording electrode wires, the directions of the electric field formed upstream the recording position W is changed accordingly, and the magnetic toner d reciprocates between the two electrode assemblies, thus forming the toner mass Rt. The surface of the electrode cylinder 5 is cleaned by the toner scraping effect of the toner mass Rt. Then, the cleaned surface of the electrode cylinder 5 reaches to the recording position W. Therefore, at the recording position W, high-resolution, clear toner recording images are stably, repeatedly formed by the surface of the electrode cylinder 5 which is cleaned by the toner mass Rt and the recording electrode wires which are cleaned by the cleaning electric field during the time t4.

The convey operation of the magnetic toner d by the magnet roller 116 may be interrupted during the cleaning time t4. Then, the amount of toner forcibly transferred onto the surface of the electrode cylinder 5 during the cleaning time t4 is decreased, thus economizing the magnetic toner d.

A remaining magnetic toner d', which has not been transferred to the electrode cylinder 5 side at the recording position W and conveyed to the downstream, is scraped down from the surface of the developing sleeve 115 by the scraping wall Sw1 and falls onto the replenish auger roller 114*a* of the horizontal circulating path. As the auger roller 114*a* is rotated, the remaining magnetic toner d', which has been scraped down and recovered, and the magnetic toner d0, which is replenished from the supply port 111*b* of the developing agent tank 111, are mixed by agitation, and are circularly conveyed in the horizontal circulating path 113 in the direction K of a broken line by the operation of the auger rollers 114*a* and 114*b*. Referring to FIG. 13, when the circulated magnetic toner d is conveyed along a longitudinal path 113*b* on the non-replenishing side, it is conveyed in the vertical direction again by the rotating magnetic field of the magnet roller 116 extending above the longitudinal path 113*b*.

In the manner as described above, the remaining magnetic toner d', which has not been transferred to the electrode cylinder 5 side at the recording position W and conveyed downward, and the replenish magnetic toner d0, are recovered smoothly to the upstream while they are being mixed by agitation as they flow along the horizontal circulating path. The toners are then used again for toner recording image formation. In this case, the magnetic toner d before being conveyed in the vertical direction is conveyed in the longitudinal path 113*b* on the non-replenish side along the axial direction of the developing sleeve 115 (widthwise direction of the toner vertical convey path: main scanning direction) while it is being agitated. Therefore, the toner d is constantly supplied to the surface of the developing sleeve 115 uniformly over the width of the surface thereof. As a result, the magnetic toner d is carried on the surface of the developing sleeve 115 to be constantly uniformly over the width thereof, and a uniform recording image having a good image density can be stably obtained. Furthermore, when the magnetic toner d is circulated and conveyed along the horizontal circulating path while it is being agitated the magnetic toner particles are brought into friction with each other, sufficiently charging the magnetic toner by friction.

The present invention is not limited to the specific embodiments described above. It is obvious that various changes and modifications may be made within the spirit and scope of the invention.

For example, the cleaning voltage for forming the cleaning electric field may be applied to the recording electrodes. In this case, the potential of the cleaning voltage is set so as to obtain a cleaning electric field of an intensity higher than that of the recording electric field. If the voltage control specifications of FIGS. 8A and 8B are to be changed, a cleaning voltage of about −250 V may be kept applied to the recording electrode wires during the time t4. In this case, a bias voltage V2 of −50 V is constantly applied to the electrode cylinder within the entire period.

Figure 16:
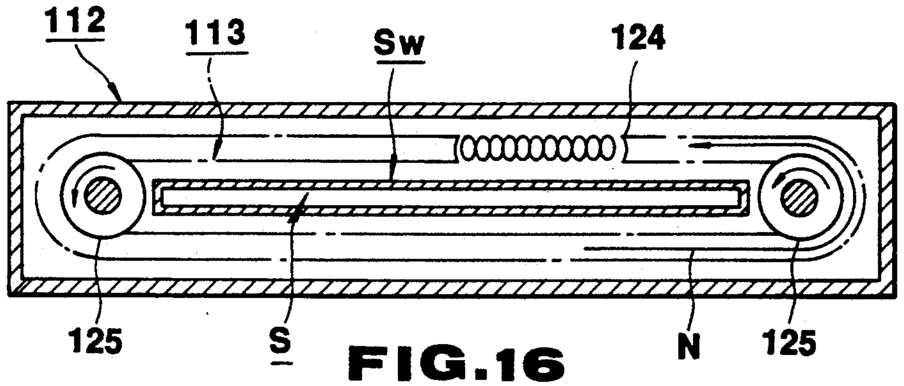
FIG. 16 shows the arrangement of another example of a developing agent convey means.

Furthermore, the circulating convey means for the developing agent can comprise a spring belt 124, as shown in FIG. 16. In this case, pulleys 125 are arranged on the two ends of the developing agent circulating path 113 having the same arrangement as that of the embodiment shown in FIG. 14, and the spring belt 124 is looped around the pulleys 125 to travel therebetween. When the pulleys 125 are driven to rotate in the direction of arrows and the spring belt 124 is pivoted in the direction of arrow N, the magnetic toner flows in the same direction as the spring belt 124 accordingly. An ordinary endless belt can also be applied in place of the spring belt 124. The belt-type circulating convey means of this embodiment can be made smaller than that of the auger roller type described above and is thus considerably advantageous in size reduction of the entire apparatus.

As is described above, according to the third embodiment of the present invention, the drive circuits for the recording electrodes are provided inside the space defined by the circulating developing agent convey path. Therefore, the same advantage of the size reduction as the first and second embodiments can be obtained.

The magnetic force is utilized so that the developing agent is conveyed upward in the vertical direction from the bottom circulating path and thereafter caused to fall and be recovered to recycle. A plurality of recording electrodes are arranged along the vertical convey path, and the opposing electrode is arranged at a very small gap with respect to the recording electrodes. A cleaning electric field is formed on the opposing electrode in order to forcibly transfer the developing agent on the recording electrode side to the opposing electrode during the non-recording period in which no recording image is formed. Hence, the developing agent can be reliably prevented from depositing on the recording electrodes. As a result, the occurrence of a voltage leakage among recording electrodes or an image defect, both of which are caused due to developing agent deposition, can be reliably prevented, thus enabling stable formation of a high-resolution, clear recording image on an ordinary sheet.

Since the signal generating means for the recording electrodes is arranged in the central space of the bottom circulating path, the structure of the developing/recording section that performs development and recording simultaneously can be greatly simplified. As a result, a small-size electrostatic recording apparatus that can stably form a high-resolution recording image on an ordinary sheet can be manufactured at a low cost.

Furthermore, since the developing agent can be uniformly supplied in the widthwise direction of the vertical convey path while being agitated to be conveyed along the bottom circulating path, a non-uniformity in image density caused by non-uniform supply of developing agent is prevented.

In addition, since the non-contact recording method is employed, durability of the electrostatic recording apparatus is improved, and a high-resolution, clear image free from non-uniformity in image density can be stably formed over a long period of time.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An electrostatic recording apparatus comprising:
   - a fixed developing agent carrying member having a surface for carrying a developing agent thereon;
   - a plurality of recording electrodes arranged on the surface of said developing agent carrying member in parallel to each other at predetermined gaps, while being electrically insulated from each other;
   - an electrode cylinder opposing said plurality of recording electrodes at a predetermined gap;
   - developing agent convey means for conveying the developing agent substantially unidirectionally to said gap so as to form a circulating convey path along the surface of said developing agent carrying member;
   - voltage control means for outputting a control signal including recording data;
   - recording electrode drive means, provided inside a space defined by said circulating convey path, for applying, upon reception of the control signal from said voltage control means, a recording voltage to said plurality of recording electrodes in accordance with the recording data, thereby selectively transferring the developing agent conveyed by said developing agent convey means to said electrode cylinder, thus forming a recording image; and
   - means for applying a predetermined recovery electric field on said electrode cylinder in order to recover the developing agent remaining on said recording electrodes to said electrode cylinder between a timing at which a first sheet is conveyed and a second timing at which a second sheet is conveyed.

2. An apparatus according to claim 1, wherein said apparatus further comprises bias means for applying, upon reception of a second control signal from said voltage control means, a corresponding bias voltage to said electrode cylinder.

3. An apparatus according to claim 1, wherein said developing agent convey means includes an electromagnet whose magnetic force changes with time, and the developing agent is circularly conveyed by the rotating magnetic field of said electromagnet.

4. An apparatus according to claim 3, further comprising means for applying an alternating current on said electromagnet.

5. An apparatus according to claim 1, wherein said developing agent convey means includes a plurality of magnet rollers, and said developing agent carrying member is bridged between said plurality of magnet rollers.

6. An apparatus according to claim 1, further comprising a scraper for separating the developing agent from said developing agent carrying member, and horizontal convey means for conveying the developing agent in a direction along which said recording electrodes are arranged, and said recording electrode drive means is arranged in a region surrounded by said developing agent convey means, said scraper, and said horizontal convey means.

7. An apparatus according to claim 1, wherein the recovery electric field has a pulse waveform.

8. An apparatus according to claim 1, wherein the developing agent is a magnetic one-component developing agent.

9. An apparatus according to claim 1, wherein the developing agent is a two-component developing agent comprising a magnetic carrier and a non-magnetic toner.

10. An electrostatic recording apparatus comprising:

a fixed developing agent carrying member having an endless surface for carrying a developing agent thereon;

a plurality of recording electrodes arranged on the surface of said developing agent carrying member in generally parallel relation to one to the other at predetermined intervals therebetween and electrically insulated one from the other;

an electrode cylinder opposing said plurality of recording electrodes defining a predetermined gap therebetween;

developing agent conveying means housed in said developing agent carrying member for conveying said developing agent substantially unidirectionally along said surface of said developing agent carrying member to said gap;

voltage control means for outputting a control signal including recording data;

recording electrode drive means, housed in said developing agent carrying member, for applying, upon reception of the control signal from said voltage control means, a recording voltage to each of said plurality of recording electrodes in accordance with said recording data by way of connecting means located through said surface of said developing agent carrying member, thereby selectively transferring the developing agent conveyed by said developing agent conveying means to said electrode cylinder, for forming a recording image; and means for applying a predetermined recovery electric field on said electrode cylinder to recover any developing agent remaining on said recording electrodes to said electrode cylinder between a timing at which a first sheet is conveyed and a second timing at which a second sheet is conveyed, said recovery electric field having a pulse waveform.

11. An apparatus according to claim 10 further comprising bias means for applying, upon reception of a second control signal from said voltage control means, a corresponding bias voltage to said electrode cylinder.

12. An apparatus according to claim 10 wherein said developing agent conveying means includes an electromagnet whose magnetic force changes with time and means for applying an alternating current to said electromagnet, whereby the developing agent is conveyed along a predetermined arcuate path by the rotating magnetic field of said electromagnet.

13. An apparatus according to claim 10 in combination with the developing agent, said developing agent being a magnetic one-component developing agent.

14. An apparatus according to claim 10 in combination with the developing agent, said developing agent being a two-component developing agent comprising a magnetic carrier and a non-magnetic toner.

* * * * *